United States Patent
Hunzinger et al.

(10) Patent No.: US 10,494,288 B2
(45) Date of Patent: Dec. 3, 2019

(54) METHOD FOR LASER-ASSISTED RESHAPING OF GLASS BODIES

(71) Applicant: SCHOTT AG, Mainz (DE)

(72) Inventors: Bernhard Hunzinger, Wackernheim (DE); Michael Waschbuesch, Undenheim (DE); Xaver Jud, Neukirch a.d. Thur (CH); Johannes Segner, St. Gallen (CH)

(73) Assignee: SCHOTT AG, Mainz (DE)

( * ) Notice: Subject to any disclaimer, the term of this patent is extended or adjusted under 35 U.S.C. 154(b) by 5 days.

(21) Appl. No.: 15/662,392

(22) Filed: Jul. 28, 2017

(65) Prior Publication Data

US 2018/0029918 A1   Feb. 1, 2018

(30) Foreign Application Priority Data

Jul. 29, 2016   (DE) .................. 10 2016 114 104

(51) Int. Cl.
*C03B 23/043* (2006.01)
*C03B 23/09* (2006.01)

(52) U.S. Cl.
CPC .......... *C03B 23/043* (2013.01); *C03B 23/092* (2013.01); *C03B 23/095* (2013.01); *Y02P 40/57* (2015.11)

(58) Field of Classification Search
None
See application file for complete search history.

(56) References Cited

U.S. PATENT DOCUMENTS

| | | |
|---|---|---|
| 1,664,154 A | 3/1928 | Jean |
| 2,392,104 A | 1/1946 | Conrad |
| 3,343,937 A | 9/1967 | Lewis |
| 3,424,570 A | 1/1969 | Couquelet |
| 3,853,522 A | 12/1974 | Guenthner |
| 4,012,217 A | 3/1977 | Reuschel |
| 4,378,989 A | 4/1983 | La Fiandra |
| 4,441,908 A | 4/1984 | Zauner |
| 4,514,206 A | 4/1985 | Roselt |
| 4,830,654 A | 5/1989 | Dichter |
| 4,923,498 A | 5/1990 | Gregory |
| 4,952,187 A | 8/1990 | Ake |
| 5,770,123 A | 6/1998 | Hatakeyama |
| 5,779,753 A | 7/1998 | Vetter |
| 5,979,187 A | 11/1999 | Churchley |
| 6,055,829 A | 5/2000 | Witzmann |
| 6,415,631 B1 | 7/2002 | Weston |

(Continued)

FOREIGN PATENT DOCUMENTS

| | | |
|---|---|---|
| DE | 102005038764 | 10/2006 |
| DE | 102006034878 | 11/2007 |

(Continued)

*Primary Examiner* — Lisa L Herring
(74) *Attorney, Agent, or Firm* — Ohlandt, Greeley, Ruggiero & Perle, L.L.P.

(57) ABSTRACT

A method is provided for reshaping a glass body rotating about its longitudinal axis. The method includes using a means for establishing a temperature profile, a radial forming tool and an axial forming tool. In the method, a first temperature profile is established and the glass body is reshaped by engaging the radial forming tool. Then a second temperature profile is established and the glass body is reshaped by engaging the axial forming tool.

20 Claims, 3 Drawing Sheets

(56) References Cited

U.S. PATENT DOCUMENTS

| | | | |
|---|---|---|---|
| 6,568,216 B2 | 5/2003 | Meguro | |
| 6,800,831 B1 | 10/2004 | Hoetzel | |
| 6,925,839 B2 | 8/2005 | Dempsey | |
| 2004/0065116 A1 | 4/2004 | Vetter | |
| 2006/0267250 A1 | 11/2006 | Gerretz | |
| 2012/0060558 A1* | 3/2012 | Haselhorst | C03B 23/092 65/29.21 |
| 2014/0190211 A1* | 7/2014 | Donelon | C03B 23/049 65/32.3 |
| 2015/0114043 A1 | 4/2015 | Risch | |

FOREIGN PATENT DOCUMENTS

| | | |
|---|---|---|
| DE | 102009031689 | 12/2010 |
| DE | 102010045094 | 3/2013 |
| DE | 102012101948 | 9/2013 |
| EP | 1197430 | 4/2002 |
| JP | 57111250 | 7/1982 |
| WO | 1999000335 | 6/1997 |
| WO | 2009135650 | 11/2009 |

* cited by examiner

METHOD FOR LASER-ASSISTED RESHAPING OF GLASS BODIES

CROSS REFERENCE TO RELATED APPLICATIONS

This application claims benefit under 35 U.S.C. 119(a) of German Patent Application No. 10 2016 114 104.6 filed Jul. 29, 2016, the entire contents of which are incorporated herein by reference.

BACKGROUND

1. Field of the Disclosure

The invention relates to a method for reshaping a glass body rotating about its longitudinal axis.

2. Description of Related Art

The forming of a shoulder region is a key method step in the production of hollow-bodied glass products such as pharmaceutical packaging made of glass. This may be, for example, syringes, ampoules, carpules or vials. Operations employed here are customarily those which use burners operated with fossil fuels to heat the glass. The customary shaping process here encompasses a number of successive heating and shaping steps, with which, starting from tubing glass bodies, the desired final geometry is approximated. Customary diameters of glass tubing used for this purpose, according to the packaging being produced, are in the range from about 6 to 40 millimetres.

Apparatus and methods in which the reshaping takes place with burners in a plurality of steps are known from DE 10 2005 038 764 B3 and DE 10 2006 034 878 B3, for example. In such methods, a repeated alternation of heating and reshaping steps is needed, because the glass body for reshaping is cooled by contact with the forming tools. Such methods are generally performed on indexing rotary machines, owing to the inexpensive operation and space-saving construction of such apparatus. Rotary machines with 16 or 32 stations, for example, are known. The division of the shaping operations into stations, however, produces a multiplicity of fault-susceptible operating parameters, which must be adjusted, at cost and involving complexity, for the fine-tuning of the overall operation.

In view of the multiplicity of adjustable parameters and of the lack of scaleability of the operating regime, the influence of the machine operator is very significant for the quality of the end product, and also for the productivity of the production operation overall.

Even if it is possible to prevent additional capital investments in costly and complicated automation functions, aside from the performance of shaping on rotary machines, which in terms of its basic principle is already comparatively inexpensive, there is nevertheless a strong dependency by production on the availability of experienced and well-trained operatives. In relation to the production costs, therefore, there is a significant staff expenditure.

Other possible disruptive factors for the processing operation include what are called running-in phenomena. These running-in phenomena come about for reasons including thermal expansion caused by the heating-up of equipment components by the burners.

A further problem arises in view of the complexity of the operating regime, in that the temperature during shaping cannot be controlled very precisely and there may therefore be quality fluctuations in the production.

DE 10 2010 045 094 B4 and DE 10 2012 101 948 A1, whose content is hereby incorporated into the present patent application by reference, disclose a production method for hollow-bodied glassware by means of laser-assisted hot shaping. Through the use of carefully controlled lasers to heat the glass body that is to be reshaped, the method disclosed in said patents allows all of the operating steps for the reshaping to be implemented in one step and thus, for example, at a single station of a rotary machine. With this method, however, it has not been possible reliably to achieve strict geometrical requirements, such as for pharmaceutical packaging, for example.

SUMMARY

It is therefore an object of the invention to specify a laser-assisted hot shaping method for glass bodies that allows the production operation to be stabilized while at least maintaining the quality of the glassware produced. Moreover, the risk of development of thickening defects in the region of the shoulders of the glassware can be reduced or even eliminated entirely.

The invention comprises a method for reshaping a glass body rotating about its longitudinal axis L, using a means for establishing a temperature profile along the longitudinal axis L, comprising a laser, a radial forming tool, which is movable radially to the longitudinal axis L, an axial forming tool, which is movable axially to the longitudinal axis L, and a rotation means, with which the glass body can be rotated. The method comprises the following steps in the specified order: establishing a first pre-defined temperature profile along the longitudinal axis L of the glass body, using the means for establishing a temperature profile; reshaping the rotating glass body by engaging the radial forming tool, so that a shoulder is formed; establishing a second pre-defined temperature profile along the longitudinal axis L of the glass body using the means for establishing a temperature profile, so that the viscosity of the glass in the region of the shoulder is at least $10^6$ dPa s and at most $10^{13}$ dPa s; and reshaping the rotating glass body by engaging the axial forming tool.

If the axial forming tool comprises a mandrel and a base, the mandrel may be introduced partly into the glass body even before the radial tool is engaged, by the mandrel and the glass body being moved relative to one another. In that case, however, it should be ensured that in the course of reshaping by means of the radial tool, the base does not come into contact with the glass body. The radial forming tool preferably remains in the engaged position during steps C and D, and is moved back into the starting position again only after the conclusion of step D.

The viscosity of the glass is to be determined in accordance with the relevant standard from the series DIN ISO 7884-2 to DIN ISO 7884-4, depending on viscosity range. The assignment valid here is at least the following: viscosities of $10^3$ dPa s and $10^6$ dPa s are to be determined according to DIN ISO 7884-2, of $10^{7.6}$ dPa s to DIN ISO 7884-3, and of $10^{13}$ dPa s to DIN ISO 7884-4.

The method of the invention is suitable for the reshaping of glass bodies having a longitudinal axis L which corresponds to the direction of their greatest extent. These may be, generally, cylindrical glass bodies whose cylinder axis lies along the longitudinal axis L, such as glass tubes or glass rods, for example. The method of the invention can also be used to reshape glass bodies having a symmetry deviating from this, or asymmetric glass bodies, such as, for example, those which have been machine-shaped in an upstream method.

Glasses suitable for reshaping by means of the method of the invention are, for example, borosilicate glasses or aluminosilicate glasses. Uses of such glasses include the manufacture of pharmaceutical packaging. Particularly preferred for use in that case is low-alkali borosilicate glass or chemically curable aluminosilicate glass.

A suitable low-alkali borosilicate glass has the following constituents in percent by weight:

$SiO_2$ 75 wt %,
$B_2O_3$ 10.5 wt %,
$Al_2O_3$ 5 wt %,
$Na_2O$ 7 wt %,
CaO 1.5 wt % and also the following relationship between viscosity η and temperature T:

$\eta=10^4$ dPa s at T=1160° C.,
$\eta=10^{7.6}$ dPa s at T=785° C.,
$\eta=10^{13}$ dPa s at T=565° C.

The temperature profile of a glass body is understood in accordance with the invention as the profile of the temperature on its surface along its longitudinal axis L. A temperature profile may either be homogeneous, meaning that there is no temperature gradient along the longitudinal axis L, or inhomogeneous, thus exhibiting different temperatures at different points on the surface. Temperature profiles of this kind may be measured by means of pyrometers or thermal imaging cameras.

Reshaping takes place in accordance with the invention with a radial and an axial forming tool. These forming tools, through being engaged correspondingly, bring about plastic deformation of the workpiece. Specifically, a workpiece is squeezed by contact with the tool. Both the radial and the axial tools may consist of one or more components, which may be mobile relative to another and possibly movable as well. The components which are in contact with the rotating glass body may be designed such that they either slide over its surface or roll over the surface.

A radial forming tool is a tool which is movable radially to the longitudinal axis L. It therefore produces a reshaping after which the workpiece has at least one taper in the reshaped region. A radial forming tool of this kind consists generally at least of two components, which are movable from opposite sides relative to the glass body and so are able to produce a squeezing action. Depending on the design of the shape of the radial forming tool, there may be both radial forces and axial forces exerted on the glass body in the course of reshaping.

An axial forming tool is a tool which is movable axially to the longitudinal axis L. An axial tool may comprise, for example, a mandrel and a base, which may also be movable axially relative to one another. Depending on the design of the shape of the axial forming tool, both radial forces and axial forces may be exerted on the glass body during reshaping.

The term "shoulder" refers in accordance with the invention to the transition region between a glass body region tapered by reshaping and an unreshaped region. The term "neck", correspondingly, refers to the tapered region itself. This is shown diagrammatically in FIG. 2. A shoulder of this kind may be described approximately by means of a shoulder angle, which depends essentially on the width of the shoulder region and the extent of the tapering. In the region of a shoulder, the contour of a glass body with shoulder has a point of inflection in the mathematical sense. The shoulder angle is formed by the angle between a tangent to the outer wall of the unreshaped region of the glass body, and the tangent at the point of inflection. This is illustrated in FIGS. 3A to 3C. Shoulder angles according to this definition can be between 0° and 180°. Shoulder angles of more than 90° may come about as a result of thickening of the neck into the unreshaped region. For pharmaceutical packaging, for example, the aim is generally for shoulder angles of between 30° and 90°.

In accordance with the invention, a pre-defined temperature profile of the glass body is established using a means which comprises a laser, which is directed at the surface of the glass body to be reshaped. In order to permit controlled establishment of a temperature profile along the longitudinal axis L, the laser is preferably directed onto the glass body at least approximately perpendicular to the longitudinal axis L. The laser, furthermore, must be selected such that its radiant energy can be absorbed by the glass body via linear or multi-photon absorption and converted into heat.

The method of the invention has the advantage that through a sequential sequence of the shaping by means of radial and axial forming tools, with glass body temperature profiles established specifically for each of these reshaping steps, the operational window for stable production of a glass body geometry which conforms to tolerance is greatly expanded. This effect is particularly marked in the forming of the shoulders of hollow-bodied glassware, since in this case the glass is subject to severe stretching in the course of reshaping, thereby reducing the wall thickness. As a result of the substantial separation of radial forming of the shoulder from axial forming of the neck, and a deliberate choice of the respective temperature profiles, it is possible to at least reduce or to rule out entirely unwanted thickening in the shoulder region and hence defective production.

As a result, the production operation can be stabilized to such an extent that fluctuations in mass of the starting material have no effect on the dimensional stability during reshaping. As a result of this, for example, the tubing glass used as starting material in the production of pharmaceutical packaging, this glass generally meeting the quality tolerances in terms of mass fluctuations in accordance with one of the standards DIN ISO 11040 for syringes, DIN ISO 13926 for carpules, DIN ISO 9187 for ampoules or DIN ISO 8362 for vials, need not be pre-sorted again in order to prevent rejects at the production stage.

In one preferred development of the invention, during method steps B and/or D, in other words during shaping by means of the radial and/or axial forming tools, the rotating glass body is irradiated at least intermittently with the laser radiation of the means for establishing an axial temperature profile. In this way it is possible to prevent or at least reduce any cooling, resulting from contact with the forming tool, for example. This also counteracts any deviation from the particular pre-defined temperature profile selected.

In a further preferred development of the invention, the first pre-defined temperature profile is selected such that in the heated state, in a region from the end face of the glass body up to at least beyond the position of the shoulder that is to be formed, the glass body has temperatures such that the viscosity of the glass in this region at any point is between $10^3$ dPa s and $10^{7.6}$ dPa s and drops to room temperature thereafter.

In a further preferred development of the invention, the second pre-defined temperature profile is selected such that in the heated state, between end face and shoulder, the glass body has temperatures such that the viscosity of the glass in this region at any point is between $10^3$ dPa s and $10^{7.6}$ dPa s, preferably between $10^3$ dPa s and $10^6$ dPa s, and in the region of the shoulder has lower temperatures, so that the viscosity of the glass in the region of the shoulder is at least $10^6$ dPa s and at most $10^{13}$ dPa s, preferably at least $10^{7.6}$ dPa s and at most $10^{13}$ dPa s, and drops to room temperature thereafter. A selection of this kind for the second temperature profile stabilizes the shoulder region for shaping by the axial forming tool. The effect of fluctuations in mass of the glass body owing to manufacturing tolerances on further shaping is likewise suppressed by this selection of the second temperature profile.

According to a further preferred development of the invention, before or during shaping, the temperature profile established along the longitudinal axis L of the glass body may be measured, and the power introduced by the means for establishing a temperature profile may be regulated in such a way as to minimize deviations between the measured temperature profile and a pre-defined temperature profile. Employed preferably for this purpose is a temperature measuring means with high lateral resolution, such as a thermal imaging camera, for example. Such regulation of the power introduced makes an additional contribution to increasing the operational stability.

In a further preferred development of the invention, the radial forming tool comprises a pair of rolls arranged in such a way that the rolls of the pair of rolls roll on the surface of a glass body set in rotation using the rotation means. In this arrangement, a glass body region lying between the rolls can be irradiated by the laser light of the means for establishing a temperature profile.

In a further preferred development of the invention, the axial forming tool comprises a forming mandrel and a base, with at least the base being movable axially. Forming mandrel and base may be made for example of tungsten, of rhodium and/or of temperature-stable ceramic materials.

In a further preferred development of the invention, between the reshaping of the glass body by engagement of the radial forming tool in step B and the reshaping by the axial forming tool in step D, preferably before the establishment of the second pre-defined temperature profile in step C, there is a cooling step which lasts preferably at least 0.01 s and at most 5 s, more preferably at least 0.1 s and at most 0.5 s and most preferably between 0.2 s and 0.3 s. During this cooling step, the irradiated power of the laser may be reduced at least in such a way that the viscosity of glass in the shoulder region formed in step B, after cooling, has a value of at least $10^6$ dPa s and at most $10^{13}$ dPa s.

In a further preferred development of the invention, method steps A, B, C and D take place at the same machine station—for example, at a single station of an indexing rotary machine. In this case it is possible preferably to do without any translational movement of the glass body between method steps A, B, C and D. In this context, the concept of the translational movement entails the transport of the glass body between different machine stations, more particularly between the stations of a rotary machine, even though in that case the glass body moves on a circular path around the axis of rotation of the rotary machine.

The invention can therefore be performed on entirely innovative designs of reshaping apparatus. As already elucidated above, rotary machines having 16 or 32 stations have been used to date. The shaping operation is traversed station by station, with the ultimate shape being achieved in a plurality of steps through sequential use of forming tools. Heating takes place between the reshaping steps in order to compensate the temperature reduction associated with reshaping. Since, in one advantageous development of the method of the invention, the heating may take place during reshaping and so a drop in temperature can be compensated, the entire hot reshaping of a section to be reshaped can be carried out in a single station. In other words, all of the forming tools used for reshaping the section are used in one reshaping station, and, during reshaping, the laser beam may heat the glass body, and/or may establish and maintain the intended temperature profile.

Correspondingly, the method of the invention can then be performed simultaneously at a plurality of stations as well, similarly to apparatus known from the prior art, with these stations carrying out reshaping steps of the same kind. In this way, reshaping of the same kind in parallel can be used to produce a considerable boost to the throughput of such a method relative to known methods.

Even in the case of implementation at a single station, there is generally a considerable speed advantage relative to the conventional method. With the conventional method, the time required for a reshaping step is typically of the order of magnitude of 2 seconds. Assuming 4 reshaping and corresponding intermediate-heating steps with burners in the case of the conventional reshaping, the total duration of reshaping is approximately 20 seconds. Conversely, with the invention it is possible to limit the reshaping time essentially to the time of a few conventional reshaping steps. Hence the reshaping operation can be accelerated considerably. Thus, the time for reshaping of a section of the glass body, reckoned without the heating time, is preferably less than 15, more preferably less than 10, especially preferably less than 5 seconds.

In a further advantageous development, the same laser can be used at least for method steps A and C, preferably for method steps A, B, C and D. This does away with capital costs associated with construction of a corresponding manufacturing plant, since there is no need to purchase a plurality of expensive lasers for different method steps. In this advantageous development, accordingly, the method exhibits enhanced economics.

Particularly in the context of use of the method of the invention for the production of pharmaceutical packaging, it is advantageous if the glass body to be reshaped is in the form of glass tubing.

BRIEF DESCRIPTION OF THE DRAWINGS

The invention is elucidated in more detail below, using exemplary embodiments and with reference to the appended figures. In the figures, identical reference symbols denote identical or corresponding elements.

DETAILED DESCRIPTION

Figure 1:
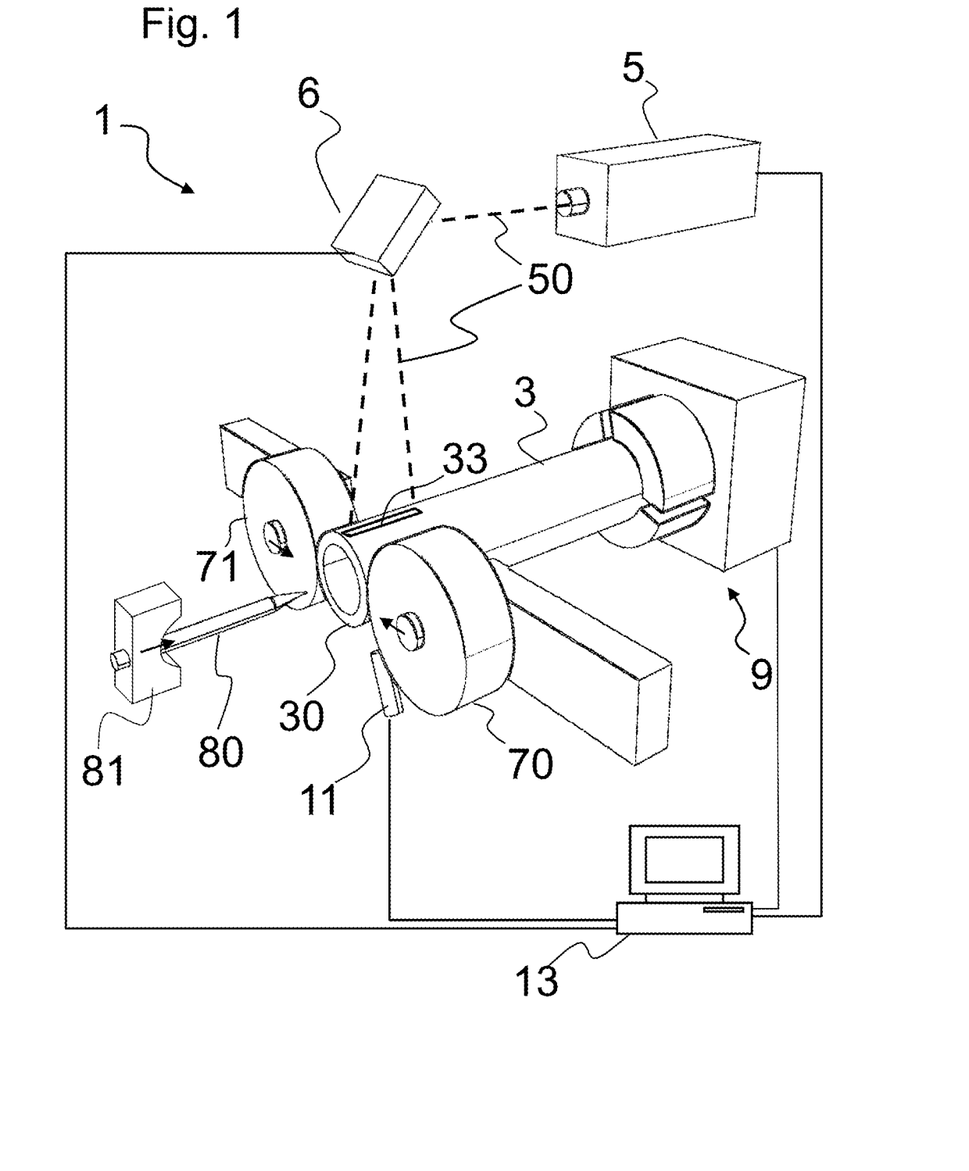
FIG. 1 illustrates an apparatus for reshaping glass bodies.

FIG. 1 shows an exemplary embodiment of an apparatus 1 for implementing the method of the invention.

The apparatus in the example shown in FIG. 1, identified as a whole by the reference 1, is designed for the reshaping of glass bodies 3 in the form of glass tubing. The apparatus is used specifically for production of pharmaceutical packaging, especially syringe bodies, ampoules, carpules and vials, the shoulder region and neck region of the glass body being formed using the apparatus 1 elements shown in FIG. 1.

The production of shoulder region and neck region from the glass tubing by means of apparatus 1 is based on a region of a glass tube 33 being heated locally above its softening point and at least a section of the heated end being reshaped with at least one forming tool; the means of local heating comprises a laser 5 which emits light of a wavelength for which the glass of the glass tubing 3 is at most partly transparent, so that the light is absorbed at least partly in the glass. For this purpose, the laser beam 50 is directed by means of controllable optics 6 onto the glass tubing 3. During the reshaping operation, the respective forming tool and the glass tubing 3 are rotated relative to one another using a rotation means 9. In general, it is useful in this case, as in the example shown, for the glass tubing 3 to be rotated with an axis of rotation along the axial direction of the glass tubing 3. Also conceivable would be an inverted configuration, with the glass tubing held in position and the forming tool rotating.

In the case of the example shown in FIG. 1, the radial forming tool comprises a pair of rolls, whose rolls 70 and 71 roll on the surface of the glass tubing 3 when the latter is in rotation. The heated end of the glass tubing becomes compressed in this case, by engagement of the rolls with the glass tubing 3 in the radial direction. The radial movement is illustrated in FIG. 1 using arrows on the axes of rotation of the rolls 70 and 71.

Additionally provided are a forming mandrel 80 and a base 81 as constituents of the axial forming tool. Forming mandrel 80 and base 81 are moved along the axis of rotation of the glass tubing 3, so that the forming mandrel 80 is introduced into the opening of the glass tubing 3 at its end face 30. This axial movement is illustrated in FIG. 1 by means of the arrow at the base 81. The forming mandrel 80 may be mounted rotatably in the base 81, so as to rotate together with the glass tubing 3. It is also possible for the rotating glass to be allowed to slide over the forming mandrel, which is held in position. In order to prevent sticking, a release agent or lubricant which lowers the friction during the sliding movement can be used for this purpose, as is generally the case for forming tools which slide over the glass surface.

Between the rolls 70 and 71 it is possible to direct the laser beam 50 onto the glass tubing, without the laser beam 50 being interrupted by the forming tool. Accordingly, the forming tool is designed so that a surface region of the glass tubing section to be reshaped is not masked by the forming tool, so that the laser light is irradiated onto the region not masked by the forming tool in the course of reshaping, by means of the optics 6 downstream of the laser. In particular, a region 33 on the periphery of the glass tubing 3, this region being situated between the rolls 70 and 71, is irradiated by the laser light. With an arrangement of this kind, it is particularly advantageous that the laser light does not directly heat the forming tools. As a result, in spite of heating of the glass body during the reshaping, the forming tool is generally heated no more greatly than in the case of a conventional operation with upstream heating by burners.

A control means 13 controls the reshaping procedure. Using the control means 13, the laser 5, more particularly its power, and also the optics 6 are driven in such a way as to establish a pre-defined temperature profile of the glass tubing 3 along the irradiated region 33. Intermittently at least, the glass tubing 3 is irradiated by the laser light in the course of reshaping. Furthermore, the movement of the radial and axial forming tools is also monitored. It is likewise possible for the rotation means 9 to be controlled as well.

The controllable optics 6 of the apparatus 1 shown in FIG. 1 serve to move the laser beam 50 over that section of the glass body that is to be heated and/or reshaped, and therefore to establish and regulate specifically pre-defined temperature profiles of the glass body. The heating power introduced into the glass body is dependent on the speed with which the laser beam is moved over the region to be heated. Since, with the controllable optics 6, it is possible to carry out specific local variation of this speed and since, additionally, it is possible to adapt the power of the laser 5 by way of the control means 13, the power introduced into the glass can be established locally with very great precision. Because the glass tubing 3 is rotating while the laser light is being irradiated, the irradiated power is distributed in the peripheral direction over the glass tubing, and so a cylindrical section, or generally a section in axial direction, independently of the shape of the glass body, is heated along the axis of rotation. The length of this section is preferably at least as great as the section to be reshaped. The latter section has a length which is determined essentially by the width of the radial forming tool, preferably the pair of rolls.

The controllable optics 6 may be configured in a variety of ways—for example, as pivotable or rotatable mirrors, rotating mirrors with mirror faces, or a spatial light modulator (SLM). Also conceivable would be a configuration in which the optics are fixed and the laser is moved, with a suitable galvanometer, pivot drive or translation drive, for example.

The apparatus shown in FIG. 1 offers the advantage that the laser radiation can be established and regulated with precision and exactitude locally, so that for each method step an optimized, pre-defined temperature profile is established along the heated section of the glass body.

Particularly suitable lasers 5 are generally infra-red lasers having wavelengths of between 780 nm and 15 μm, since the transmission of glasses typically falls from the visible spectral range towards the infra-red range. The wavelength of the laser is preferably selected such that the glass of the glass article to be machined has an absorption coefficient at the wavelength of at least 300 $m^{-1}$, more preferably at least 500 $m^{-1}$. In the case of an absorption coefficient of 300 $m^{-1}$, about 25% of the laser power will then be absorbed on passage through the walls of a glass tube having a wall thickness of 1 mm. In the case of an absorption coefficient of 500 $m^{-1}$, about 40% of the light is already absorbed and can be utilized for the heating of the glass body.

Generally speaking, lasers with a radiant power of less than 1 kW are sufficient to ensure adequately rapid heating of the glass for the reshaping of glass bodies. In order to maintain the temperature during reshaping, less power is generally required. In many cases a radiant power of less than 200 watts is sufficient for this purpose. A preferred range of the irradiated power is between 30 and 100 watts. For the shaping of larger glass articles, as for example the shaping of glass articles composed of glass tubing with a diameter of 20 millimetres or more, however, greater powers may possibly also be favourable in order to ensure rapid heating. An example in this context would be the shaping of the bottle neck for pharmaceutical vials.

Regulation of the laser power may in particular also be undertaken on the basis of the established temperature profile of the glass tubing 3. For this purpose, in the control means 13, a regulating operation may be implemented which regulates the laser power and the controllable optics 6 on the basis of a temperature profile measured using a measuring means, in order to establish a pre-defined temperature profile on the glass body. As a measuring means of this kind, in the case of the example shown in FIG. 1, a thermal imaging camera 11 is provided which measures the thermal radiation of the glass tubing at the region thereof heated by the laser 5. The measurement values are supplied to the control means 13 and used in a regulating operation to establish the desired temperature profile.

Figure 2:
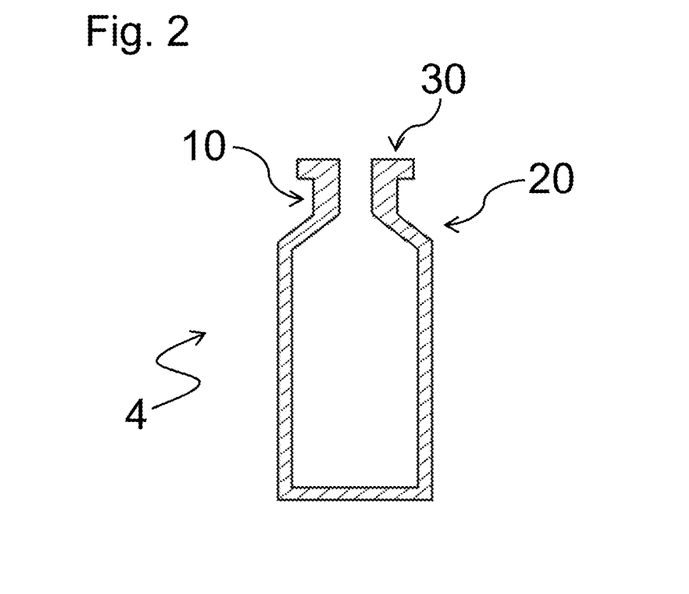
FIG. 2 is a diagrammatic representation of a reshaped glass body with formed neck, shoulder, and an end face.
Figure 3A:
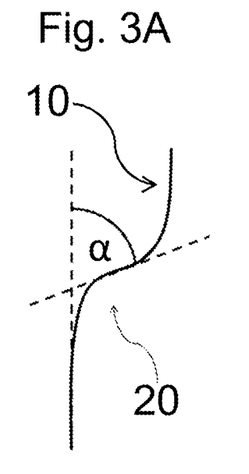
FIGS. 3A, 3B, and 3C illustrate shoulder angles (a) of a reshaped glass body as a result of thickening in the shoulder region.
Figure 3B:
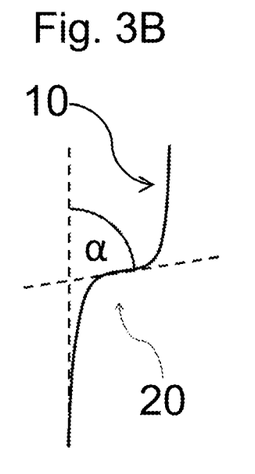
Figure 3C:
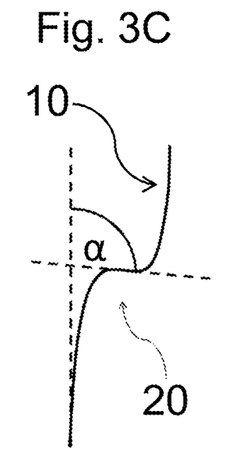

FIG. 2 shows a diagrammatic representation of a cross section through a pharmaceutical packaging means made of glass 4, having a neck 10 formed by hot reshaping, and having a shoulder 20 and also an end face 30. The packaging means depicted is a rolled rim vial. Other packaging means differ from this primarily in the dimensions, the design of the collar on the end face, and the design of the end of the packaging means opposite the end face. For instance, carpules and syringes have an open design at this face, with syringes generally having a finger support additionally at this point. Ampoules, in contrast, after having been filled, are closed at the end face by means of a hot shaping process. A feature common to all of these packaging means, however, is at least that they have a neck 10 and a shoulder 20.

Shown diagrammatically in FIGS. 3A, 3B and 3C is a detail of the shoulder 20 and neck 10 region of a reshaped glass body. After the reshaping, the shoulder 20 here has a shoulder angle α, which is given by the angle between the tangent at the point of inflection of the shoulder contour, represented as a dashed line, and also a vertical reference line, likewise depicted as a dashed line. This shoulder angle is required to meet precise mandates both on the inside and on the outside of a reshaped glass body. In the case of pharmaceutical packaging, for example, the shoulder angle at the inner wall of the packaging means determines its capacity for being fully discharged. At the same time, a deviation in the shoulder angle on the outside of the packaging means may have the effect at the same time that attachments such as screw lids, caps or syringe needles, for example, cannot be mounted in accordance with use. FIG. 3A shows an example of a shoulder angle—of less than 90°, in the case depicted—in accordance with mandates. FIG. 3B shows an unwanted malformation through deviation from this angle, with a shoulder angle of almost 90°, and FIG. 3C shows a corresponding severe malformation with a shoulder angle of greater than 90°, as may result by thickening of the shoulders during hot shaping. The incidence of such defects is greatly reduced, and therefore even completely ruled out, by the method of the invention.

Figure 4:
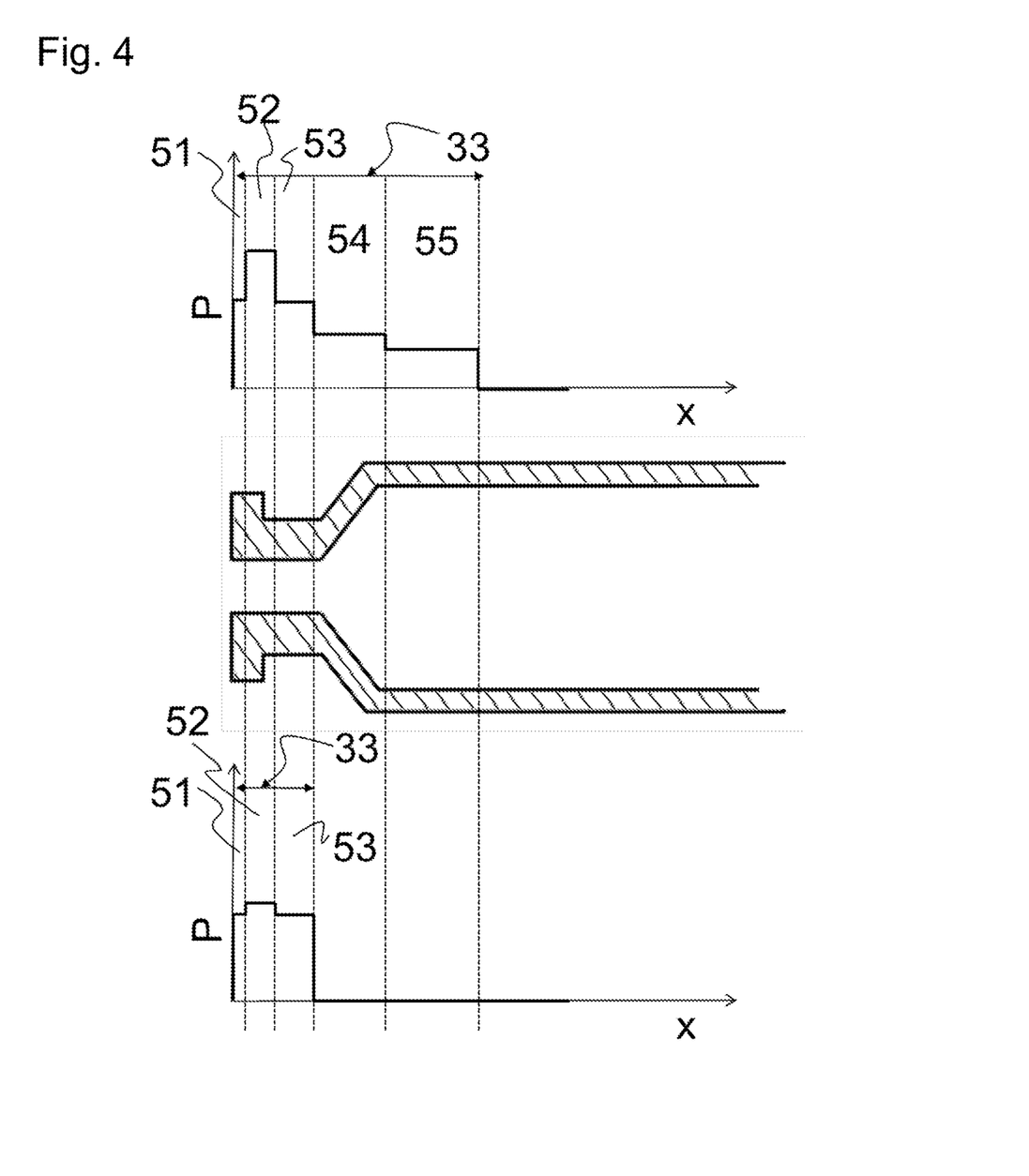
FIG. 4 is a diagrammatic schema of first and second profiles of the irradiated laser power as a function of the axial position (x) along a glass body.

FIG. 4 shows, for illustration, two conceivable embodiments of the distribution of the laser power P on the glass body for establishing the first and second temperature profiles, respectively, along the glass body in direction x.

Shown in each case is a diagram of the laser power P as a function of the axial position x of the point of impingement of the laser beam on the glass body. For greater ease of reference of the axial subsections of the laser power 51 to 55, a cross section through a reshaped glass body with formed neck and shoulder is shown diagrammatically between the profiles. As can be seen from the diagram, the entire irradiated axial section 33 in the case of this example is subdivided into subsections 51, 52, 53, 54 and 55. Subsection 51 is in the region of the end face of the glass body, sections 52 and 53 in the region of the neck, 54 in the region of the shoulder, and 55 in the region behind the shoulder.

For the first profile, shown at the top in FIG. 4, subsections 51-53 are irradiated, by way of example, with a greater power P of the laser than are subsections 54 and 55. Uneven deposition of the laser power in the x-direction in this way may be advantageous in a number of respects. Where, for example, the aim is for a homogeneous temperature distribution during the reshaping operation, but the removal of heat is inhomogeneous, the establishment of a corresponding profile in the irradiated power P may at least partly compensate for the inhomogeneity of the heat losses. For example, subsections of the glass body which come into contact first or for longer with the radial forming tool may be heated more strongly, correspondingly, by way of the laser radiation, in order to compensate the heat losses which occur additionally on the forming tool.

Alternatively, a temperature profile which is inhomogeneous in the x-direction may be used to exert additional control over the flow of material that occurs in the course of reshaping, by way of the viscosity of the glass. Taking account of the pressure or tension exerted by the radial forming tool, the glass typically tends to flow from hotter and hence softer regions towards colder and hence tougher regions in the glass body. One advantageous option, for instance, is to reduce the associated decrease in the wall thickness of a glass tube in regions in which the forming tool causes substantial deformation. This is the case in particular for sharp stretches and bends of the glass material. Very advantageously likewise, an increased flow of material may be induced if, on the basis of a radial compression of a glass tube, there is an increase in the wall thickness.

To the skilled person it is evident that the invention is not confined to the merely exemplary embodiments described above with reference to the figures, but can instead be varied in diverse ways within the subject matter of the present disclosure. In particular, the features of individual exemplary embodiments may also be combined with one another.

Thus, the invention in the figures has been described with reference to the forming of pharmaceutical packaging. In a corresponding way, however, the invention can also be applied to the reshaping of other glass bodies. Furthermore, the use of the laser as a heating means is not exclusive. Instead, additionally, other heating means may also find application. For instance, it is possible, and in view of the high heating power it may also be advantageous, to carry out preheating with a burner in order to reduce the initial heating time prior to the reshaping operation.

LIST OF REFERENCE SYMBOLS

1 apparatus for reshaping glass bodies
3 glass body, e.g. glass tubing
4 pharmaceutical packaging made of glass
5 laser
6 controllable optics
9 rotation means
10 neck of a reshaped glass body
11 thermal imaging camera
13 control means
20 shoulder of a reshaped glass body
30 end face of a reshaped glass body
33 irradiated region of 3
50 laser beam
51-55 subsections of 33
70, 71 rolls of the radial shaping tool
80 shaping mandrel of the axial shaping tool
81 base of the axial shaping tool

What is claimed is:
1. A method for reshaping a glass body, comprising:
rotating the glass body about a longitudinal axis;

establishing, in the rotating glass body, a first temperature profile along the longitudinal axis;

reshaping, after establishing the first temperature profile, the rotating glass body by engaging a radial forming tool so that a shoulder is formed, wherein engaging the radial forming tool comprises moving the radial forming tool in a direction that is radial to the longitudinal axis;

ensuring, during the step of reshaping using the radial tool, that a base of an axial forming tool does not come into contact with the glass body;

establishing, in the rotating glass body, a second temperature profile along the longitudinal axis of the glass body that is different than the first temperature profile so that a second viscosity of glass in a region of the shoulder is at least $10^6$ dPa s and at most $10^{13}$ dPa s; and reshaping, after establishing the second temperature profile, the rotating glass body by engaging the axial forming tool, wherein the engaging the axial forming tool comprises moving at least the base of the axial forming tool in a direction that is axial to the longitudinal axis.

2. The method according to claim 1, wherein the step of establishing the first and/or second temperature profile comprises irradiating the rotating glass body at least intermittently with laser radiation.

3. The method according to claim 2, wherein the step of establishing the first temperature profile comprises establishing the first temperature profile so that a first viscosity of the glass in any portion of a region from an end face of the glass body up to at least beyond a position of the shoulder is between $10^3$ dPa s and $10^{7.6}$ dPa s and drops to room temperature thereafter.

4. The method according to claim 1, wherein the step of establishing the first temperature profile comprises establishing the first temperature profile so that a first viscosity of the glass in any portion of a region from an end face of the glass body up to at least beyond a position of the shoulder is between $10^3$ dPa s and $10^{7.6}$ dPa s and drops to room temperature thereafter.

5. The method according to claim 2, further comprising controlling the laser radiation so that deviations from the first and/or second temperature profile are minimized.

6. The method according to claim 2, wherein the irradiating to establish the first and second temperature profiles comprise irradiating using a common laser.

7. The method according to claim 1, wherein the step of establishing the second temperature profile comprises establishing the first temperature profile so that a first viscosity of glass at any point in a region between an end face of the glass body and the region of the shoulder is between $10^3$ dPa s and $10^{7.6}$ dPa s and drops to room temperature thereafter.

8. The method according to claim 7, wherein the first viscosity is between $10^3$ dPa s and $10^6$ dPa s.

9. The method according to claim 7, wherein the second viscosity is between at least $10^{7.6}$ dPa s and at most $10^{13}$ dPa s.

10. The method according to claim 1, wherein the radial forming tool comprises a pair of rolls that move in the direction that is radial to the longitudinal axis.

11. The method according to claim 1, further comprising cooling the glass body from the first temperature profile before the step of reshaping after establishing the second temperature profile, wherein the cooling lasts at least 0.01 s and at most 5 s.

12. The method according to claim 11, the cooling lasts between 0.2 s and 0.3 s.

13. The method according to claim 1, wherein the steps of rotating, establishing the first temperature profile, reshaping after establishing the first temperature profile, establishing the second temperature profile, and reshaping after establishing the second temperature profile take place at a common machine station.

14. The method according to claim 1, further comprising no translational movement of the glass body between the steps of rotating, establishing the first temperature profile, reshaping after establishing the first temperature profile, establishing the second temperature profile, and reshaping after establishing the second temperature profile.

15. The method according to claim 1, wherein the glass body is glass tubing.

16. A method for reshaping a glass body, comprising:
rotating the glass body about a longitudinal axis, the glass body having an end face region, a shoulder region, and a location beyond the shoulder region;

heating the glass body from the end face region up to the location beyond the shoulder region to a first temperature profile;

reshaping the glass body to form a shoulder in the shoulder region after establishing the first temperature profile by moving a radial forming tool into contact with the glass body in a direction that is radial to the longitudinal axis;

ensuring, during the step of reshaping to form the shoulder, that a base of an axial forming tool does not come into contact with the glass body;

heating, after forming the shoulder, the glass body from the end face region to the shoulder region to a second temperature profile that is different than the first temperature profile; and reshaping the glass body to form a neck after establishing the second temperature profile by moving the base of the axial forming tool into contact with an end face of the glass body in a direction that is axial to the longitudinal axis.

17. The method of claim 16, wherein the radial forming tool remains in contact with the glass body during the step of reshaping the glass body to form the neck.

18. The method of claim 16, further comprising cooling the glass body after reshaping the glass body to form the shoulder, but before heating the glass body to the second temperature profile.

19. The method of claim 16, further comprising introducing a mandrel of the axial forming tool into the glass body before the step of reshaping the glass body to form the shoulder.

20. A method for reshaping a glass body, comprising:
rotating the glass body about a longitudinal axis;
establishing, in the rotating glass body, a first temperature profile along the longitudinal axis;
moving an axial forming tool in a direction that is axial to the longitudinal axis so that a mandrel of the axial forming tool is in an opening of the rotating glass body and so that a base of the axial forming tool is not in contact with an end face of the rotating glass body;
moving, after establishing the first temperature profile, a radial forming tool in a direction that is radial to the longitudinal axis into engagement with the rotating glass body so that a shoulder is formed in the rotating glass body without the end face coming into contact with the base;
establishing, in the rotating glass body, a second temperature profile along the longitudinal axis of the glass body that is different than the first temperature profile; and moving, after establishing the second temperature profile, the base in the direction that is axial to the longitudinal axis into contact with the end face while the radial forming tool remains in contact with the rotating glass body so that a neck is formed in the rotating glass body.

* * * * *